(12) United States Patent
Rehtanz et al.

(10) Patent No.: US 8,495,948 B2
(45) Date of Patent: Jul. 30, 2013

(54) POWER DISTRIBUTION UNIT WITH A HYDROSTATIC AND MECHANICAL POWER BRANCH

(75) Inventors: Roland Rehtanz, Tettnang (DE); Udo Brehmer, Konstanz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 749 days.

(21) Appl. No.: 12/748,662

(22) Filed: Mar. 29, 2010

(65) Prior Publication Data

US 2010/0263365 A1    Oct. 21, 2010

(30) Foreign Application Priority Data

Apr. 15, 2009  (DE) .......................... 10 2009 002 370

(51) Int. Cl.
F01B 9/00  (2006.01)
(52) U.S. Cl.
USPC .......................................................... 92/136
(58) Field of Classification Search
USPC ......... 60/469, 456; 92/84, 143, 136; 403/403, 403/408.1, 359.1, 359.2, 359.4–359.6; 91/505, 91/506
See application file for complete search history.

(56) References Cited

U.S. PATENT DOCUMENTS

| 2,510,414 | A  | * | 6/1950  | Philbrick ........................ 464/154 |
| 6,817,268 | B1 | * | 11/2004 | Hildebrand et al. ......... 74/730.1 |
| 8,156,738 | B2 | * | 4/2012  | Gollner ............................ 60/492 |
| 2004/0261408 | A1 | * | 12/2004 | Fleming et al. ................ 60/487 |
| 2007/0277520 | A1 |   | 12/2007 | Gollner |

FOREIGN PATENT DOCUMENTS

| DE | 103 22 233     A1 | 12/2004 |
| DE | 10 2006 052 410 A1 | 7/2007  |
| DE | 10 2006 025 347 B3 | 12/2007 |

* cited by examiner

Primary Examiner — Edward Look
Assistant Examiner — Logan Kraft
(74) Attorney, Agent, or Firm — Davis & Bujold, PLLC

(57) ABSTRACT

A power distribution transmission unit (1) having a hydrostatic power branch (2) and a mechanical power branch (3) connected by a connection system (8). The connection system (8) at least partially damps transfer of oscillations between the power branches. The power flow can be passed between the power branches, via a connecting shaft (22) that compensates axial offset between a hydrostat shaft (18) of the hydrostatic power branch (2) and a mechanical branch shaft (20) of the mechanical power branch (3). The connecting shaft (22) is a hollow shaft and a spring device (27), elastically prestressing the hydrostat shaft (18), is arranged within the connecting shaft. The tooth profiles (23, 25) of the connecting shaft (22) are formed as curved outer teeth which engage in tooth profiles (24 and 26) of the hydrostat shaft (18) of the hydrostatic power branch (2) and of the shaft (20) of the mechanical power branch (3), in each case made as inner teeth.

14 Claims, 5 Drawing Sheets

POWER DISTRIBUTION UNIT WITH A HYDROSTATIC AND MECHANICAL POWER BRANCH

This application claims priority from German patent application serial no. 10 2009 002 370.4 filed Apr. 15, 2009.

FIELD OF THE INVENTION

The invention concerns a power distribution transmission unit with a hydrostatic and a mechanical power branch.

BACKGROUND OF THE INVENTION

A power distribution transmission unit with a mechanical and a hydraulic power branch is known from DE 103 22 233 A1. The hydraulic or hydrostatic power branch is, in each case, connected by a shaft to the mechanical power branch. During the operation of the power distribution transmission unit, in order to substantially diminish the transfer of oscillations that occur in the area of the hydrostatic power branch into the transmission housing and into the mechanical power branch, damping elements are provided in the area of the connection point of a hydraulic motor with a hydraulic pump of the hydrostatic power branch, by which the motor and the pump are fixed in the transmission housing with damping. By virtue of the said damping elements, the hydraulic motor and the hydraulic pump are allowed some freedom of movement within the elastic range of the damping elements.

Any axial offset between the hydrostatic power branch and the mechanical power branch, that occurs due to the said movement, is compensated by a shaft that connects the hydrostatic power branch with the mechanical power branch, the said shaft having in its connection area to the hydrostatic power branch and also in its connection area to the mechanical power branch crown bevel gearing, in each case.

The disadvantage of this, however, is that the shaft length required for compensating the axial offset between the mechanical and the hydrostatic power branches of the power distribution transmission units causes the power distribution transmission unit to occupy substantial axial space.

From DE 10 2006 052 410 A1, a stub shaft is known, which connects a drive input gear rotationally fixed to a camshaft of an internal combustion engine. The stub shaft fits into the drive input gear and the camshaft, in each case, via a double crown bevel gear, whereby a large offset between the gear and the camshaft can be compensated with a stub shaft of a short length.

DE 10 2006 025 347 B3 describes a hydraulic module with two integrated inclined disks or inclined-axis gears for hydrostatic-mechanical power distribution transmission units, such that in the area of driveshafts each of which is formed with external teeth in a connection area with a mechanical power branch of a power distribution transmission unit, the hydraulic module can be connected to the mechanical power branch of the power distribution transmission unit.

By means of the external teeth of the driveshaft, deflections in the area of a hydraulic motor or a hydraulic pump of the hydraulic module cannot be compensated to the same extent as in the two systems described above and know from the prior art. Even a connection of the hydraulic module to the mechanical power branch of a power distribution transmission unit, corresponding to that described in DE 103 22 233 A1 or DE 10 2006 052 410 A1, does not reduce the axial fitting space required for the power distribution transmission unit to the desired extent.

SUMMARY OF THE INVENTION

Thus, the purpose of the present invention is to make available a power distribution transmission unit which is favorable in terms of fitting space, at least in the axial direction, in which a hydrostatic power branch is connected to a mechanical power branch in an oscillation-damping manner.

In the power distribution transmission unit according to the invention, a hydrostatic power branch and a mechanical power branch are connected via a connection system. The connection system at least partially damps the transfer of oscillations between the hydrostatic and the mechanical power branches. The power flow between the hydrostatic power branch and the mechanical power branch can be led through a connecting shaft that compensates an axial offset between a hydrostat shaft of the hydrostatic power branch and a shaft of the mechanical power branch. The connecting shaft engages with a first tooth profile, in a tooth profile of the hydrostat shaft, and is in active connection, via a second tooth profile, with a tooth profile of the shaft of the mechanical power branch.

To be able to construct the power distribution transmission unit according to the invention such that it occupies little space in the axial direction, the connecting shaft is in the form of a hollow shaft and a spring device, that pre-stresses the hydrostat shaft, is arranged at least partially within the connecting shaft, in such manner that compared with power distribution transmission units known from the prior art, the external dimensions of this power distribution transmission unit, in the axial direction, are additionally optimized in that the tooth profiles of the connecting shaft are formed as curved outer teeth, which engage respectively with inner teeth of the hydrostat shaft and of the shaft of the mechanical power branch.

In a simple and inexpensive manner, this last-mentioned design of the connection shaft offers the possibility of being able to compensate for even fairly large axial offsets between the hydrostat shaft and the shaft of the mechanical power branch to the desired extent, with a short connecting shaft.

The arrangement of the spring device that spring-loads the hydrostat shaft in the connecting shaft, in turn, opens the possibility of arranging the connecting shaft in an inside area of the hydrostat shaft which, in power distribution transmission units or hydraulic modules known from the prior art, has previously been provided only for the arrangement of the spring device. By virtue of the nested arrangement of the hydrostat shaft, the connecting shaft and the spring device according to the invention, the external dimensions of the power distribution transmission unit according to the invention, in the axial direction, are smaller and further optimized by comparison with known power distribution transmission units in which a connection area between a connecting shaft and a hydrostat shaft and the spring device are arranged next to one another in the axial direction.

In a further embodiment of the power distribution transmission unit characterized by a small axial fitting space requirement, the connecting shaft is at least partially arranged radially inside a bearing device of the hydrostat shaft.

To be able to ensure a lubrication oil supply to the power distribution transmission unit, in a further advantageous embodiment of the power distribution transmission unit a seal device is arranged between the hydrostat shaft and the shaft of the mechanical power branch, the said seal device preferably being made as an elastomer seal in order to ensure a sealing action in the event of axial offset between the hydrostat shaft and the shaft of the mechanical power branch.

A further development of the power distribution transmission unit, according to the invention which requires little axial fitting space, is characterized by an overlap zone between the hydrostat shaft and the shaft of the mechanical power branch, in which the seal device is arranged.

In a simply designed and inexpensive embodiment of the power distribution transmission unit according to the invention, the spring device which elastically pre-stresses the hydrostat shaft, comprises a spring sleeve and at least one spring element arranged therein, the said spring element resting, at one end, against the said spring sleeve and, at the other end, against a piston element that can move longitudinally within the spring sleeve.

In a further advantageous embodiment of the power distribution transmission unit which is simple to produce and to assemble, in the assembled position the spring sleeve presses against a collar of the hydrostat shaft.

In an advantageous further development of the power distribution transmission unit, the piston element is pressed by the spring element against a housing of the hydrostatic power branch for the elastic pre-stressing of the hydrostat shaft.

In other advantageous embodiments of the power distribution transmission unit, to ensure a lubrication oil supply to the power distribution transmission unit in a simply designed manner the piston element and/or the spring sleeve is provided with a through-going bore.

In other advantageous embodiments of the power distribution transmission unit, the piston element and/or the spring sleeve is provided with a through-going bore to ensure a lubrication oil supply to the path in a simply designed manner.

In a further development of the power distribution transmission unit, lubrication oil supply to the teeth between the connecting shaft and the hydrostat shaft and between the connecting shaft and the shaft of the mechanical power branch is ensured with little production effort by at least one radial oil bore between the tooth profiles of the connecting shaft.

An embodiment of the power distribution transmission unit. characterized by little assembly effort. has a multi-component transmission housing with the hydrostatic power branch accommodated in a first part of the housing and the mechanical power branch in a second part of the housing.

A further development of the power distribution transmission unit also characterized by little assembly effort comprises a baseplate associated with the hydrostatic power branch between the housing components.

In an embodiment of the power distribution transmission unit characterized by a high level of oscillation decoupling, the connection system comprises screw joints by which the housing components of the transmission housing and the baseplate can be coupled to one another. In the area of the screw joints, damping elements extending between the first part of the housing and the baseplate and between the second part of the housing and the baseplate are provided by means of which oscillations. occurring during operation in the area of the hydrostatic or the mechanical power branch. are passed on in a damped condition in the direction of the mechanical or the hydrostatic power branch, with little constructive effort.

BRIEF DESCRIPTION OF THE DRAWINGS

Other advantages and advantageous further developments of the invention emerge from the claims and from the example embodiment described in principle with reference to the drawing, which shows:

DETAILED DESCRIPTION OF THE PREFERRED EMBODIMENTS

Figure 1:
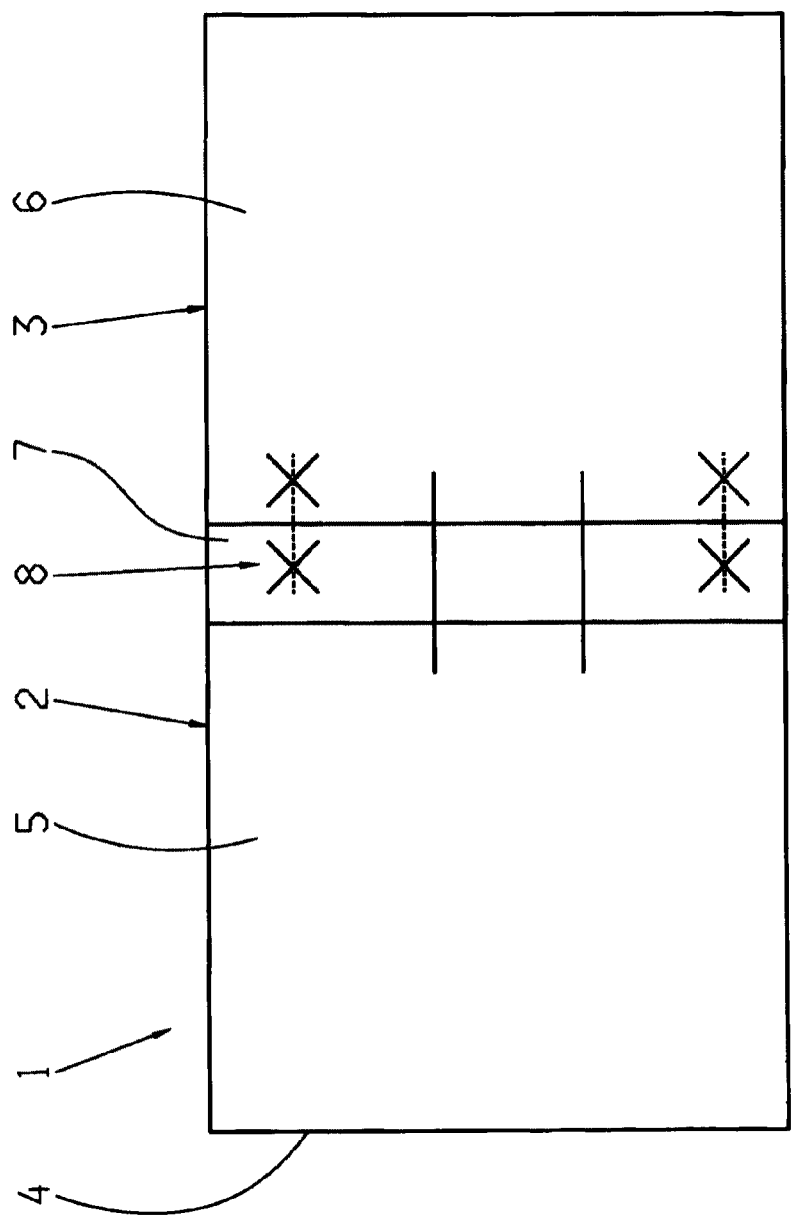
FIG. 1: A very schematic representation of a power distribution transmission unit with a hydrostatic power branch and a mechanical power branch.

FIG. 1 shows a very schematic representation of a power distribution transmission unit 1 with a hydrostatic power branch 2 and with a mechanical power branch 3 connected to one another by a connection system 8. A transmission housing 4 of the power distribution transmission unit is formed as more than one part, the hydrostatic power branch 2 being arranged in a first part 5 of the housing and the mechanical power branch 3 in a second part 6 of the housing. A baseplate 7, associated with the hydrostatic power branch 2, is provided between the housing parts 5 and 6.

Figure 2:
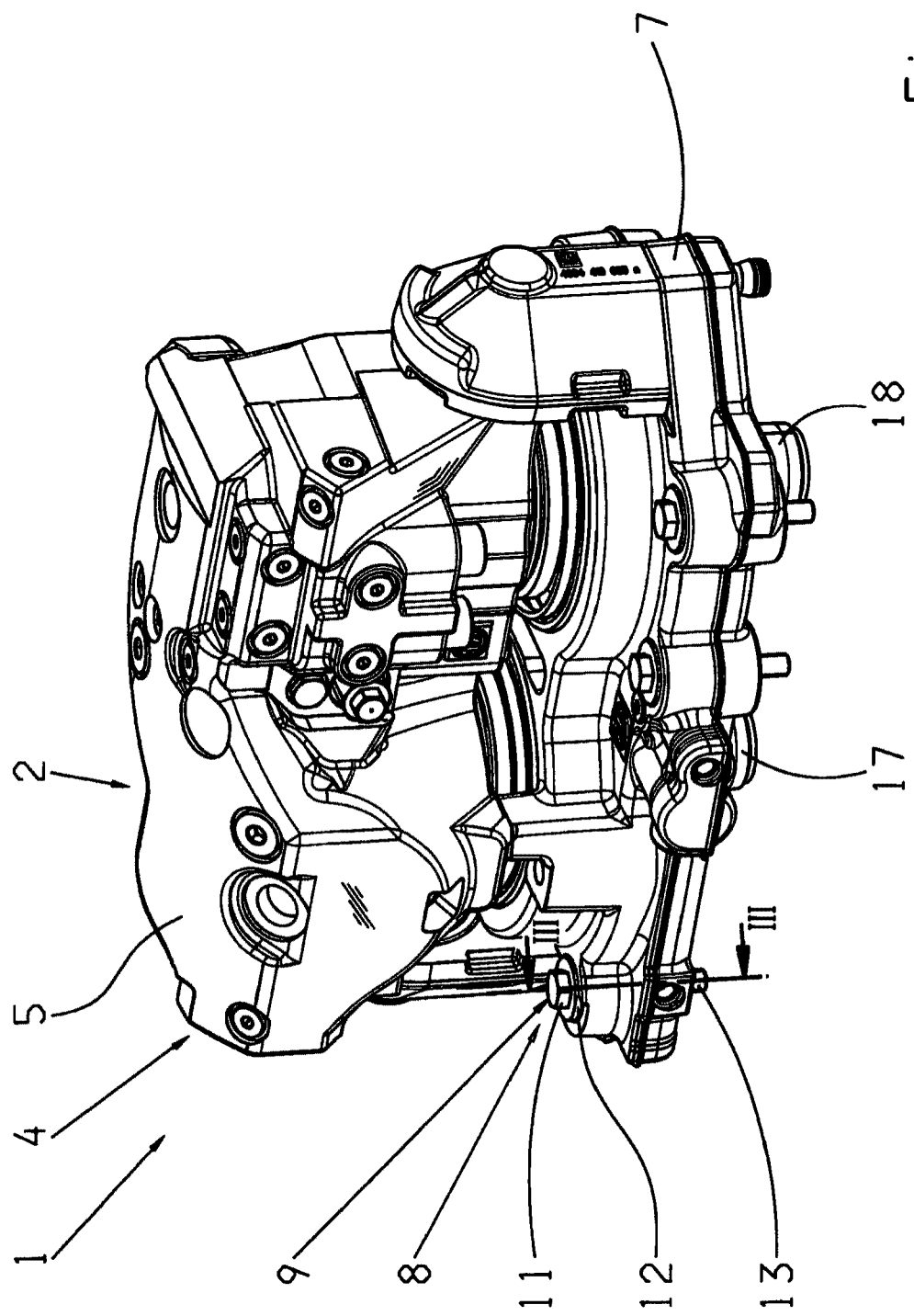
FIG. 2: A three-dimensional view of a hydrostatic power branch of a power distribution transmission unit.
Figure 3:
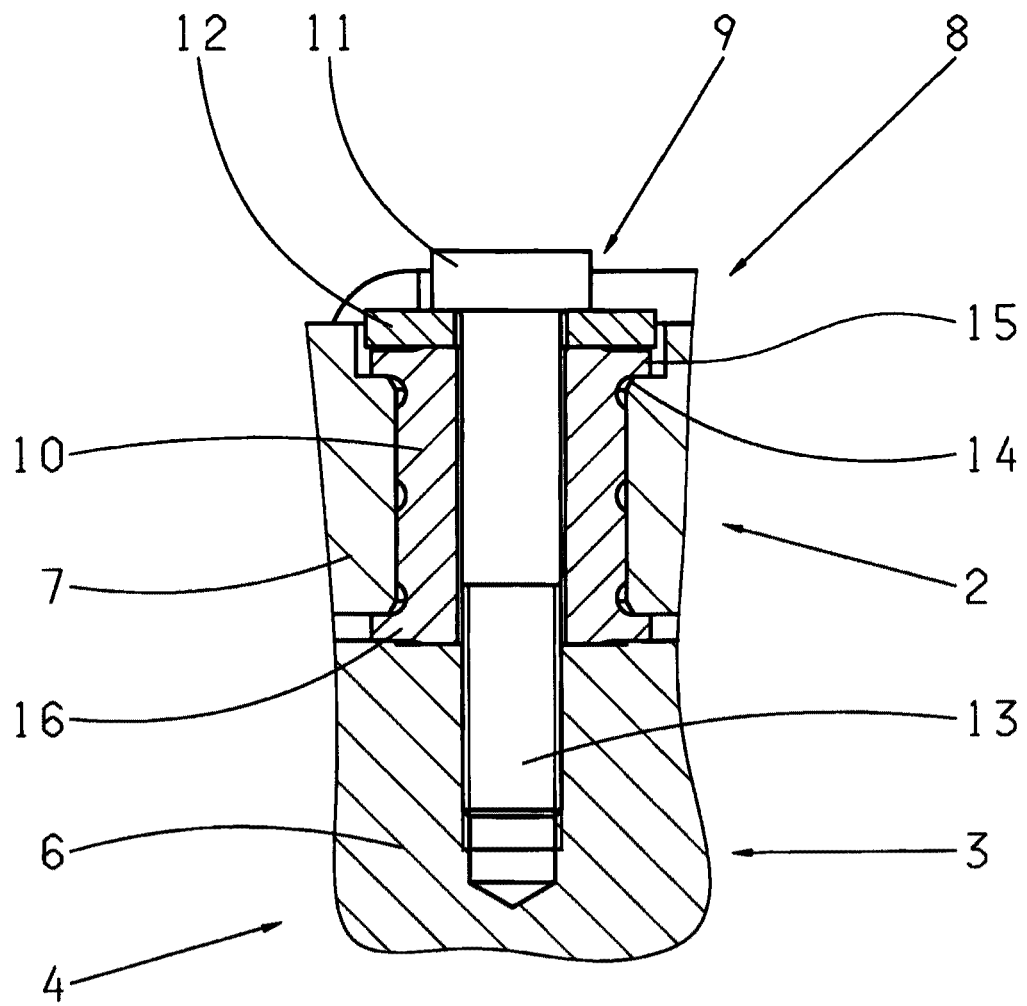
FIG. 3: Enlarged view of a sectional detail of a connection system of the power distribution transmission unit, along a section line III-III shown in FIG. 2.

FIG. 2 shows a three-dimensional representation of the first housing part 5 and the baseplate 7 fixedly connected to the first housing part 5 of the hydrostatic power branch 2. From the representation according to FIG. 2 in combination with the sectioned view in FIG. 3, which shows an enlarged view of a detail of the connection device 8 seen as sectioned along the line III-III in FIG. 2, it can be seen that the first housing part 5 and the baseplate 7 can be coupled to the second housing part 6 by means of screw joints 9 of the connecting device 8.

In order to at least partially damp the transfer of oscillations, produced between the hydrostatic power branch 2 and the mechanical power branch 3, in the area of the connection system 8 during the operation of the power distribution transmission unit 1, damping elements 10 that extend between the first housing part 5 and the baseplate 7 are provided in the area of the screw joints 9 which are, in this case, made of rubber and which allow some tilting between the baseplate 7 connected fixed to the first housing part 5, and the second housing part 6. A metallic washer 12, by which the screw force of the screw joint 9 is applied to the damping element 10 across the entire end face of the latter, is positioned between a screw head 11 of a screw element 13 of the screw joint 9 and the damping element 10.

In its end area remote from the screw head 11, the screw element 13 of the screw joint 9 is screwed into a thread of the second housing part 6. In an area of the baseplate 7 facing toward the screw head 11, the baseplate 7 has a shoulder 14 against which the damping element 10 rests with a part thereof having a larger diameter 15, positioned between the metallic washer 12 and the shoulder 14 of the baseplate 7.

Furthermore, the damping element 10 extends in the abutment area between the baseplate 7 and the second housing part 6 with another section of a larger diameter 16, so that the screw force produced by screwing the screw element 13 into the second housing part 6 passes, starting from the screw head 11, via the metallic washer 12 and the larger-diameter area 15, into the baseplate 7 and then, via the other larger-diameter area 16 of the damping element 10, in turn, into the second housing part 6 which supports it.

The two areas 15 and 16 of the damping element 10 with larger diameters, being made of rubber, allow some tilting between the baseplate 7 and the second housing part 6 and damp the transfer of oscillations between the hydrostatic power branch 2 and the mechanical power branch 3.

Figure 4:
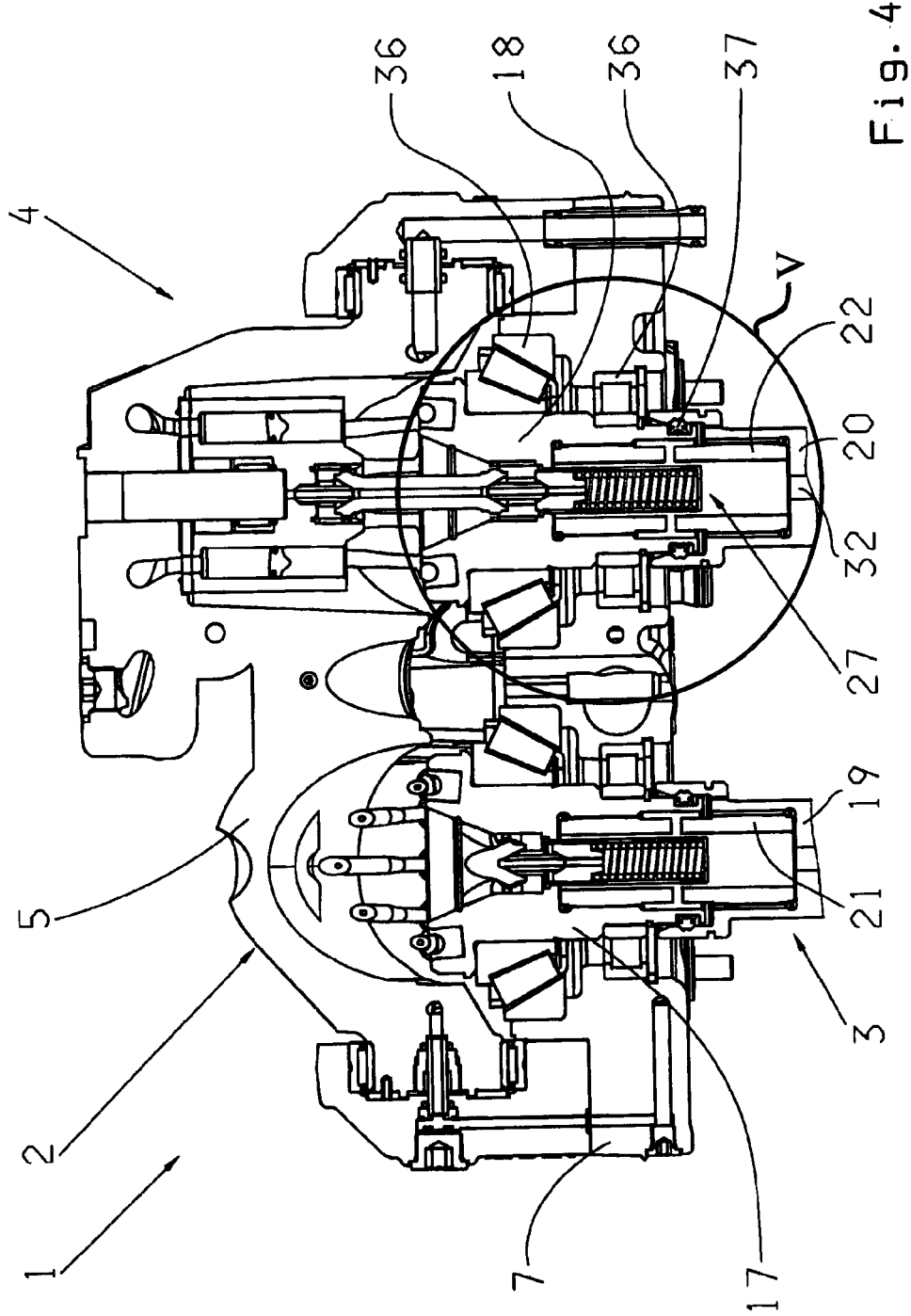
FIG. 4: Three-dimensional sectioned view of the power branch according to FIG. 1.
Figure 5:
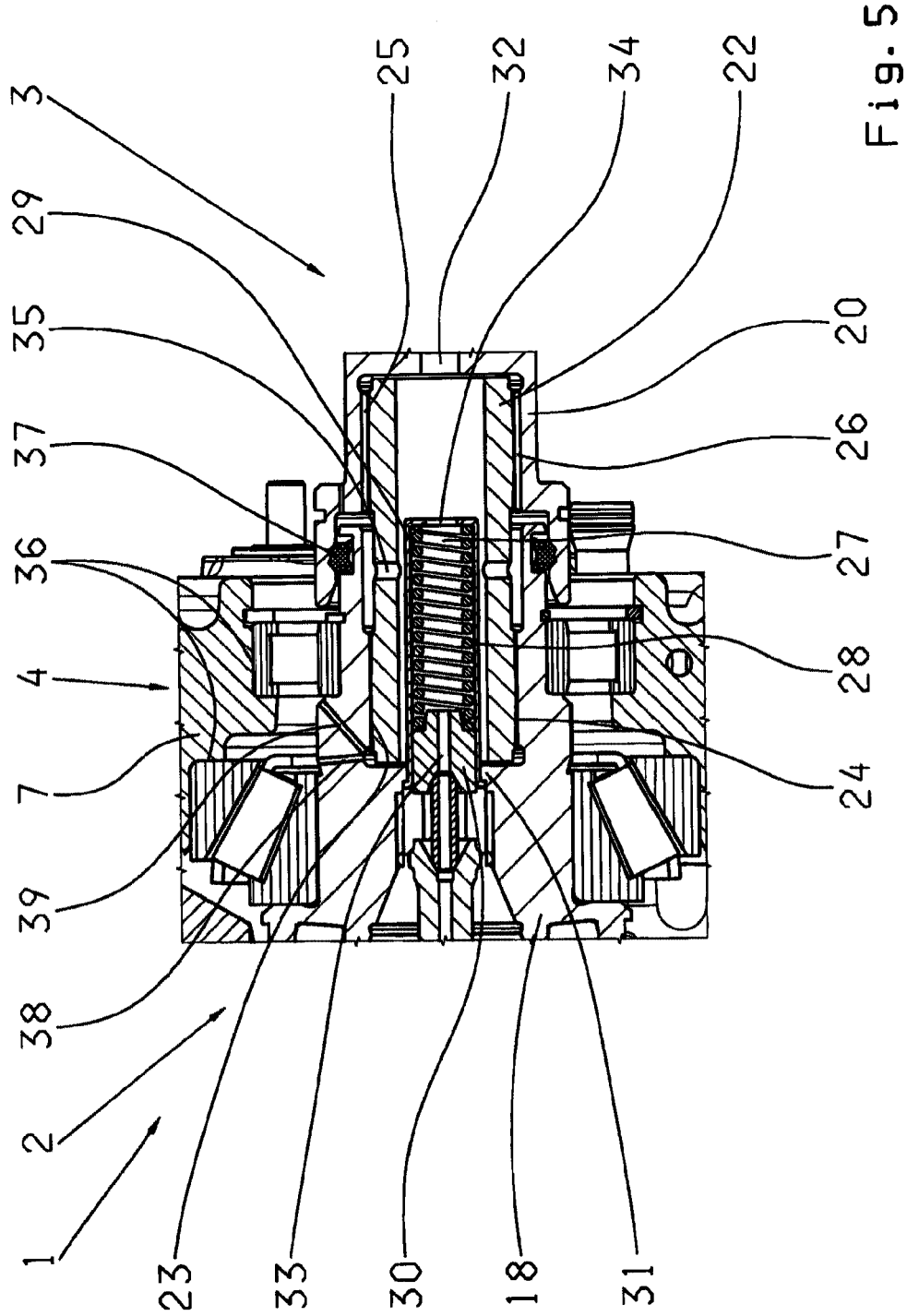
FIG. 5: Enlarged sectioned view of an area V indicated in FIG. 4.

FIG. 4 shows a three-dimensional cross-section of the area of the power distribution transmission unit 1 depicted in FIG. 2. Furthermore, FIG. 5 shows an enlarged section view of an area marked as V in FIG. 4.

Below, with reference to the representation in FIGS. 4 and 5, a mechanical connection between the hydrostatic power branch 2 and the mechanical power branch 3 is described in more detail via which connection the power flow, between the two power branches 2 and 3, passes and in the area of which axial offsets and tilts between the hydrostatic power branch 2 and the mechanical power branch 3 can be compensated, while the axial fitting space required for the power distribution transmission unit 1 remains small.

By virtue of the possible tilting in the area of the connection system 8, between the baseplate 7 and the second housing part 6 in which the mechanical power branch 3 of the power distribution transmission unit 1 is arranged, during operation of the power distribution transmission unit 1, hydrostat shafts 17, 18 of the hydrostatic power branch 2 and mechanical branch shafts 19, 20 of the mechanical power branch 3 are connected by means of connecting shafts 21, 22.

In the area of the connecting shafts 21, 22, axial offsets and tilts between the hydrostat shafts 17 and 18 of the hydrostatic power branch and the shafts 19, 20 of the mechanical power branch 3, rotationally fixedly connected thereto, can be compensated to an extent which ensures the functionality of the power distribution transmission unit, in the manner described below.

The structure of the mechanical connections, between the hydrostat shafts 17 and 18 of the hydrostatic power branch 2 and the shafts 19 and 20 of the mechanical power branch 3, is substantially identical so the design configuration and the resulting mode of operation of the connections will be described in detail below essentially with reference to the connection between the hydrostat shaft 18 and the shaft 20, illustrated in FIG. 5.

With a first tooth profile 23, the connecting shaft 22 engages in a tooth profile 24 of the hydrostat shaft 18. In addition, the connecting shaft 22 is actively connected by means of a second tooth profile 25 with a tooth profile 26 of the shaft 20 of the mechanical power branch 3. The tooth profiles 23 and 25 of the connecting shaft are configured as curved outer teeth which engage, respectively, in the tooth profiles 24 and 26 of the hydrostat shaft 18 and the shaft 20 made as inner teeth.

By virtue of the configuration of the tooth profiles 23 and 25 of the connecting shaft 22 as curved outer teeth, tilting between the hydrostatic power branch 2 and the mechanical power branch 3, or between the hydrostat shafts 17 and 18 and the shafts 19 and 20, can be compensated by the connecting shafts 21 and 22, each of the latter having a small axial length.

In addition, the connecting shaft 22 is made as a hollow shaft in which a spring device 27, which at least partially pre-stresses the hydrostat shaft 18 elastically against the first housing part 5, is arranged. The spring device 27 comprises a spring sleeve 28 and a spring element 29 arranged therein, which is guided by the spring sleeve 28. The spring element 29 rests, at one end, against the spring sleeve 28 and, at the other end, against a piston element 30 arranged to move longitudinally within the spring sleeve 28. In the assembled position, the spring sleeve 28 is pressed by the spring element 29 against a collar 31 of the hydrostat shaft 18, while the piston element 30 is pressed by the spring element 29 against the first housing part 5 of the power distribution transmission unit 1.

In the present case, lubrication oil is supplied to the area of the power distribution transmission unit 1, shown in FIG. 5, starting from the mechanical power branch 3, through a lubrication oil bore 32 of the shaft 20. To ensure a flow of lubrication oil from the lubrication oil bore 32 to the inside of the hydrostat shaft 18, both the piston element 30 and the spring sleeve 28 are provided with respective through-going bores 33 and 34. The bearing device 36 of the hydrostat shaft 18 is supplied with lubrication oil via lubrication oil bores 38, 39 in the hydrostat shaft 18.

To improve the circulation of lubrication oil through the teeth between the connecting shaft 22 and the hydrostat shaft 18 and the shaft 20, the connecting shaft 22 is provided with radial oil bores 35 between its tooth profiles 23 and 25. Compared with known power distribution transmission units, the structural dimensions of the power distribution transmission unit 1 in the axial extension of the hydrostat shaft 18 and the shaft 20 are also smaller because the connecting shaft 22 is arranged radially inside a bearing device 36 of the hydrostat shaft 18.

To be able to make the power distribution transmission unit 1 with a desired small fitting space requirement in the axial direction, in addition the seal device 37 is provided in a radial overlap zone between the shaft 20 and the hydrostat shaft 18. Furthermore, to ensure lubrication oil supply to the area of the power distribution transmission unit 1 depicted in FIG. 5, the seal device 37 arranged between the hydrostat shaft 18 of the power branch 2 and the shaft of the mechanical power branch 3 is, in this case, in the form of an elastomer seal in order to compensate for the gap size variation caused by axial offsets and tilting between the hydrostat shaft 18 and the shaft 20 around the circumference of the hydrostat shaft 18.

The power distribution transmission unit 1 described above is a structural-space-saving design in which oscillations are decoupled by rubber dampers in the area between the baseplate 7 and the second housing part 6. The radial offsets or tilts between the hydrostat shafts 17 and 19 and the shafts 19 and 20 of the mechanical power branch 3, that result from this oscillation decoupling, are compensated by the connecting shafts 21 and 22 made with curved teeth, so that perfect transfer of a torque to be passed between the hydrostatic power branch 2 and the mechanical power branch 3 is ensured, at the same time as a small axial fitting space requirement.

INDEXES

1 Power distribution transmission unit
2 Hydraulic power branch
3 Mechanical power branch
4 Transmission housing
5 First part of the transmission housing
6 Second part of the transmission housing
7 Baseplate
8 Connection system
9 Screw joint
10 Damping element
11 Screw head
12 Metallic washer
13 Screw element
14 Shoulder on the baseplate
15, 16 Areas of the damping element with a larger diameter
17, 18 Hydrostat shaft
19, 20 Shaft 21, 22 Connecting shaft
23 Tooth profile on the connecting shaft
24 Tooth profile on the hydrostat shaft
25 Second tooth profile on the connecting shaft
26 Tooth profile of the shaft
27 Spring device
28 Spring sleeve
29 Spring element
30 Piston element
31 collar on the hydrostat shaft
32 Central lubrication oil bore
33 Through-going bore of the piston element
34 Through-going bore of the spring sleeve
35 Oil bore
36 Bearing device of the hydrostat shaft
37 Seal device
38, 39 Lubrication oil bore

The invention claimed is:

1. A power distribution transmission unit (1) with a hydrostatic power branch (2) and a mechanical power branch (3) connected by a connection system (8) such that the connection system (8) at least partially damps transfer of oscillations between the hydrostatic power branch (2) and the mechanical power branch (3), and
a power flow, between the hydrostatic power branch (2) and the mechanical power branch (3), being passable via a connecting shaft (22) which compensates for axial offset between a hydrostat shaft (17, 18) of the hydrostatic power branch (2) and a mechanical branch shaft (19, 20) of the mechanical power branch (3),
the connecting shaft (22) engaging, via a first tooth profile (23), with a tooth profile (24) of the hydrostat shaft (18) and being actively connected, via a second tooth profile (25), with a tooth profile (26) of the mechanical branch shaft (20) of the mechanical power branch (3),
wherein the connecting shaft (21, 22) is a hollow shaft and a spring device (27), which elastically pre-stresses the hydrostat shaft (17, 18), is arranged at least partially within the connecting shaft (21, 22),
the tooth profiles (23, 25) of the connecting shaft (22) are formed as curved outer teeth which respectively engage with the tooth profiles (24 and 26) of the hydrostat shaft (18) of the hydrostatic power branch (2) and the mechanical branch shaft (20) of the mechanical power branch (3), which are made as inner tooth profiles, and
a seal device (37) is arranged between the hydrostat shaft (18) and the mechanical branch shaft (20) of the mechanical power branch (3).

2. The power distribution transmission unit according to claim 1, wherein the connecting shaft (21, 22) is arranged at least in part radially within a bearing device (36) of the hydrostat shaft (18).

3. The power distribution transmission unit according to claim 1, wherein the seal device (37) is in the form of an elastomer seal.

4. The power distribution transmission unit according to claim 1, wherein the hydrostat shaft (18) and the mechanical branch shaft (20) of the mechanical power branch (3) overlap at an overlap zone, and the seal device (37) is arranged in the overlap zone.

5. The power distribution transmission unit according to claim 1, wherein the spring device (27) comprises a spring sleeve (28) and at least one spring element (29) arranged therein, and the spring element (29) abuts, at a first end thereof, against a spring sleeve (28) and abuts, at a second end thereof, against a piston element (30) arranged to move longitudinally in the spring sleeve (28).

6. The power distribution transmission unit according to claim 5, wherein, in an assembled condition, the spring sleeve (28) is pressed by the spring element (29) against a collar (31) of the hydrostat shaft (18).

7. The power distribution transmission unit according to claim 5, wherein the piston element (30) is pressed by the spring element (29) against a housing part (5) of the hydrostatic power branch (2).

8. The power distribution transmission unit according to claim 7, wherein a transmission housing (4) is formed from more than one part, and the hydrostatic power branch (2) is arranged in a first housing part (5) of the housing and the mechanical power branch (3) is arranged in a second housing part (6) of the housing.

9. The power distribution transmission unit according to claim 8, wherein a baseplate (7), associated with the hydrostatic power branch (2), is provided between the first and the second housing parts (5, 6).

10. The power distribution transmission unit according to claim 1, wherein the first housing part (5) and the baseplate (7) are coupled to one another by screw joints (9) of the connection device (8) and damping elements (10), which extend between the first housing part (5) and the baseplate (7), are provided in an area of the screw joints (9).

11. The power distribution transmission unit according to claim 5, wherein the piston element (30) is provided with a through-going bore (33).

12. The power distribution transmission unit according to claim 5, wherein the spring sleeve (28) is provided with a through-going bore (34).

13. The power distribution transmission unit according to claim 1, wherein the connecting shaft (22) has at least one radial oil bore (35) between the tooth profiles (23, 24).

14. A power distribution transmission unit (1) with a hydrostatic power branch (2) and a mechanical power branch (3) connected by a connection system (8) such that the connection system (8) at least partially damps transfer of oscillations between the hydrostatic power branch (2) and the mechanical power branch (3);
a power flow, between the hydrostatic power branch (2) and the mechanical power branch (3), being passable via a connecting shaft (22) which compensates for axial offset between a hydrostat shaft (17, 18) of the hydrostatic power branch (2) and a mechanical branch shaft (19, 20) of the mechanical power branch (3); and
the connecting shaft (22) engaging, via a first tooth profile (23), with a tooth profile (24) of the hydrostat shaft (18) and being actively connected, via a second tooth profile (25), with a tooth profile (26) of the mechanical branch shaft (20) of the mechanical power branch (3);
wherein the connecting shaft (21, 22) is a hollow shaft and a spring device (27), which elastically pre-stresses the hydrostat shaft (17, 18), is arranged at least partially within the connecting shaft (21, 22);
the tooth profiles (23, 25) of the connecting shaft (22) are formed as curved outer teeth which respectively engage with the tooth profiles (24 and 26) of the hydrostat shaft (18) of the hydrostatic power branch (2) and the mechanical branch shaft (20) of the mechanical power branch (3), which are made as inner tooth profiles,
the spring device (27) comprises a spring sleeve (28) and at least one spring element (29) arranged therein, and the spring element (29) abuts, at a first end thereof, against a spring sleeve (28) and abuts, at a second end thereof, against a piston element (30) arranged to move longitudinally in the spring sleeve (28);

the piston element (30) is pressed, by the spring element (29), against a housing part (5) of the hydrostatic power branch (2);

a transmission housing (4) is formed from more than one part, and the hydrostatic power branch (2) is arranged in a first housing part (5) of the housing and the mechanical power branch (3) is arranged in a second housing part (6) of the housing;

a baseplate (7), associated with the hydrostatic power branch (2), is provided between the first and the second housing parts (5, 6); and the first housing part (5) and the baseplate (7) are coupled to one another by screw joints (9) of the connection device (8) and damping elements (10), which extend between the first housing part (5) and the baseplate (7), are provided in an area of the screw joints (9).

\* \* \* \* \*